US008645454B2

(12) United States Patent
Mathew

(10) Patent No.: US 8,645,454 B2
(45) Date of Patent: Feb. 4, 2014

(54) TASK ALLOCATION MULTIPLE NODES IN A DISTRIBUTED COMPUTING SYSTEM

(75) Inventor: Manoj Mathew, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 514 days.

(21) Appl. No.: 12/980,100

(22) Filed: Dec. 28, 2010

(65) Prior Publication Data

US 2012/0166514 A1    Jun. 28, 2012

(51) Int. Cl.
*G06F 13/00* (2006.01)

(52) U.S. Cl.
USPC .......................................................... 709/201

(58) Field of Classification Search
USPC .......................................... 709/201; 718/105
See application file for complete search history.

(56) References Cited

U.S. PATENT DOCUMENTS

| 5,898,870 | A | 4/1999 | Okuda et al. ................... 395/674 |
|---|---|---|---|
| 6,922,791 | B2 | 7/2005 | Mashayekhi et al. .............. 714/4 |
| 7,590,984 | B2 | 9/2009 | Kaufman et al. ............. 718/105 |
| 7,693,931 | B2 | 4/2010 | Polan ............................. 709/201 |
| 2008/0298230 | A1 | 12/2008 | Luft et al. ..................... 370/219 |
| 2009/0216893 | A1 | 8/2009 | Errickson et al. ............. 709/230 |
| 2009/0328034 | A1 | 12/2009 | Corcoran et al. ................. 718/1 |
| 2010/0082979 | A1 | 4/2010 | Edwards ........................ 713/168 |
| 2010/0088304 | A1 | 4/2010 | Jackson ......................... 707/706 |
| 2010/0241884 | A1* | 9/2010 | Barsness et al. .............. 713/322 |

OTHER PUBLICATIONS

Figueiredo, et al, "A Case for Grid Computing on Virtual Machines" (2002).
Dean, et al., "MapReduce: Simplified Data Processing on Large Clusters," OSDI'04: Sixth Symposium on Operating System Design and Implementation (2004).
Yang, et al., "Map-Reduce-Merge: Simplified Relational Data Processing on Large Clusters," SIGMOD'07 (2007).
Isard, et al., "Dryad: Distributed Data-Parallel Programs from Sequential Building Blocks," EuroSys'07 (2007).

* cited by examiner

*Primary Examiner* — Robert B Harrell
(74) *Attorney, Agent, or Firm* — Fitzpatrick, Cella, Harper & Scinto

(57) ABSTRACT

Work is distributed amongst a plurality of nodes. A first plurality of tasks is extracted, where the number of tasks is selected in correspondence to the number of nodes, and where sizes of the tasks are sized based on a job load metric. The first plurality of tasks is distributed. A determination is made whether a time difference between a response from a node that is first to complete its task and a response from a node that is last to complete its task exceeds a predefined threshold. In response to a determination that the time difference exceeds the predefined threshold, the job load metric is adjusted. A second plurality of tasks is extracted, where the number of tasks is selected in correspondence to the number of nodes, and wherein sizes of the tasks are sized based on the adjusted job load metric. The second plurality of tasks is distributed.

36 Claims, 7 Drawing Sheets

TASK ALLOCATION MULTIPLE NODES IN A DISTRIBUTED COMPUTING SYSTEM

FIELD

The present disclosure relates to distributed computing, and more specifically relates to allocation of tasks amongst nodes in a distributed computing environment.

BACKGROUND

In the field of distributed computing, individual computers are typically linked together to form a computing cluster for the purpose of solving computationally-extensive problems. A computing cluster typically consists of a front end node and multiple compute nodes. Under this arrangement, the front end node typically allocates a problem to the compute nodes by dividing the problem into multiple tasks and distributing those tasks amongst the compute nodes for processing.

According to one technique for task allocation, the front end node divides a problem into equally-sized tasks and distributes the tasks to the compute nodes for processing. Upon distribution of the tasks, the front end node waits for the compute nodes to complete their assigned tasks, and to transmit the results back to the front end node for further processing.

SUMMARY

One difficulty with such implementations typically arises when a computing cluster consists of compute nodes that vary in terms of hardware and software resources. In such clusters, all compute nodes are typically assigned a task of the same size, irrespective of the hardware and software capabilities of the individual compute nodes. Naturally, resource-rich compute nodes complete their tasks faster than other compute nodes. As a consequence, the front end node must wait for the slower compute nodes to finish their tasks before the next set of tasks can be assigned to the compute nodes. Meanwhile, the faster compute nodes, which have already completed their tasks, remain idle, thus reducing the overall utilization of the computing cluster.

One technique for overcoming this issue is to assign new tasks to the faster compute nodes immediately upon completion of their previously-assigned tasks, thereby preventing the faster nodes from remaining idle. However, this solution is often inadequate because completion of the overall problem is still constrained by the slowest node, which might have been assigned a task that is too large for its capabilities.

The foregoing situation is addressed herein by sizing tasks based on a dynamically adjusted job load metric, where the job load metric is dynamically adjusted responsive to a time difference between a response from a node that is first to complete its task and a response from a node that is last to complete its task.

Thus, in an example embodiment described herein, work is distributed amongst a plurality of nodes in a distributed computing environment. A first plurality of tasks is extracted from the work, where the number of tasks in the first plurality of tasks is selected in correspondence to the number of nodes, and where sizes of the tasks in the first plurality of tasks are sized based on a job load metric of each of the nodes. The first plurality of tasks is distributed to at least some of the nodes for processing. A determination is made whether a time difference between a response from a node that is first to complete its task and a response from a node that is last to complete its task exceeds a predefined threshold. In response to a determination that the time difference exceeds the predefined threshold, the job load metric of at least some of the nodes is adjusted.

Thereafter, a second plurality of tasks is extracted from the work, where the number of tasks in the second plurality of tasks is selected in correspondence to the number of nodes, and where sizes of the tasks in the second plurality of tasks are sized based on the adjusted job load metric of each of the nodes. The second plurality of tasks is distributed to at least some of the nodes for processing.

By sizing tasks based on a dynamically adjusted job load metric, it is ordinarily possible to size the tasks such that, after several iterations, all tasks tend to complete at around the same time, within the predefined threshold. As a consequence, there is a reduction in the amount of time a front end node must wait between responses from the compute nodes, thereby resulting in a decrease in compute node idle times and an increase in computing cluster utilization.

In another example embodiment, a qualification task is transmitted for execution by each node, where the qualification task measures capabilities of core elements in a node, where an influence factor is assigned to each core element, and where the influence factor is used to adjust the weight of the core element on a capability measurement of the node. In particular, the results from the executed qualification task from each node are received and the job load metric for each node is calculated by using the results from the executed qualification task.

In another example embodiment, the distribution of work amongst a plurality of nodes in a distributed computing environment comprises a repetition of the steps of determining whether a time difference between a response from a node that is first to complete its task and a response from a node that is last to complete its task exceeds a predefined threshold, adjusting the job load metric of at least some of the nodes responsive to a determination that the time difference exceeds the predefined threshold, extracting a second plurality of tasks from the work, where the number of tasks in the second plurality of tasks is selected in correspondence to the number of nodes, and where sizes of the tasks in the second plurality of tasks are sized based on the adjusted job load metric of each of the nodes, and distributing the second plurality of tasks to at least some of the nodes for processing.

In still another example embodiment, the work available for distribution is dynamic in nature such that the amount of work available for distribution is received on an ongoing basis, and where the work available for distribution is distributed and processed in the order received.

In yet another example embodiment, responsive to a determination that the time difference does not exceed the predefined threshold, a second plurality of tasks is extracted from the work, where the number of tasks in the second plurality of tasks is selected in correspondence to the number of nodes, and where sizes of the tasks in the second plurality of tasks are based on the unadjusted job load metric of each of the nodes and the second plurality of tasks is distributed to some of the nodes for processing.

In a further example embodiment, adjusting the job load metric comprises dynamically adjusting capacity utilizations for at least some of the core elements in a node during runtime, and adjusting the job load metric using the dynamically adjusted capacity utilizations of the core elements in the node.

In another example embodiment, dynamically adjusting capacity utilizations for at least some of the core elements in a node during runtime comprises reducing the capacity utilizations for a plurality of core elements in the worst performing nodes, and increasing the capacity utilizations for a plurality of core elements in the remaining nodes, wherein adjustments to the capacity utilizations for the plurality of core elements are made in descending order of the influence factor assigned to the core elements.

In yet another example embodiment, dynamically adjusting capacity utilizations for at least some of the core elements in a node during runtime comprises reducing the capacity utilization for a core element assigned the highest influence factor in the node that is last to complete its task, by a predetermined amount, and increasing the capacity utilization for the core element assigned the highest influence factor in the remaining nodes, wherein the amount increased in each node is proportionate to the existing capacity utilizations for the core element assigned the highest influence factor in the remaining nodes, and wherein the cumulative increase amongst the remaining nodes is equal to the amount that was reduced in the node that is last to complete its task.

This brief summary has been provided so that the nature of this disclosure may be understood quickly. A more complete understanding can be obtained by reference to the following detailed description and to the attached drawings.

DETAILED DESCRIPTION

Figure 1:
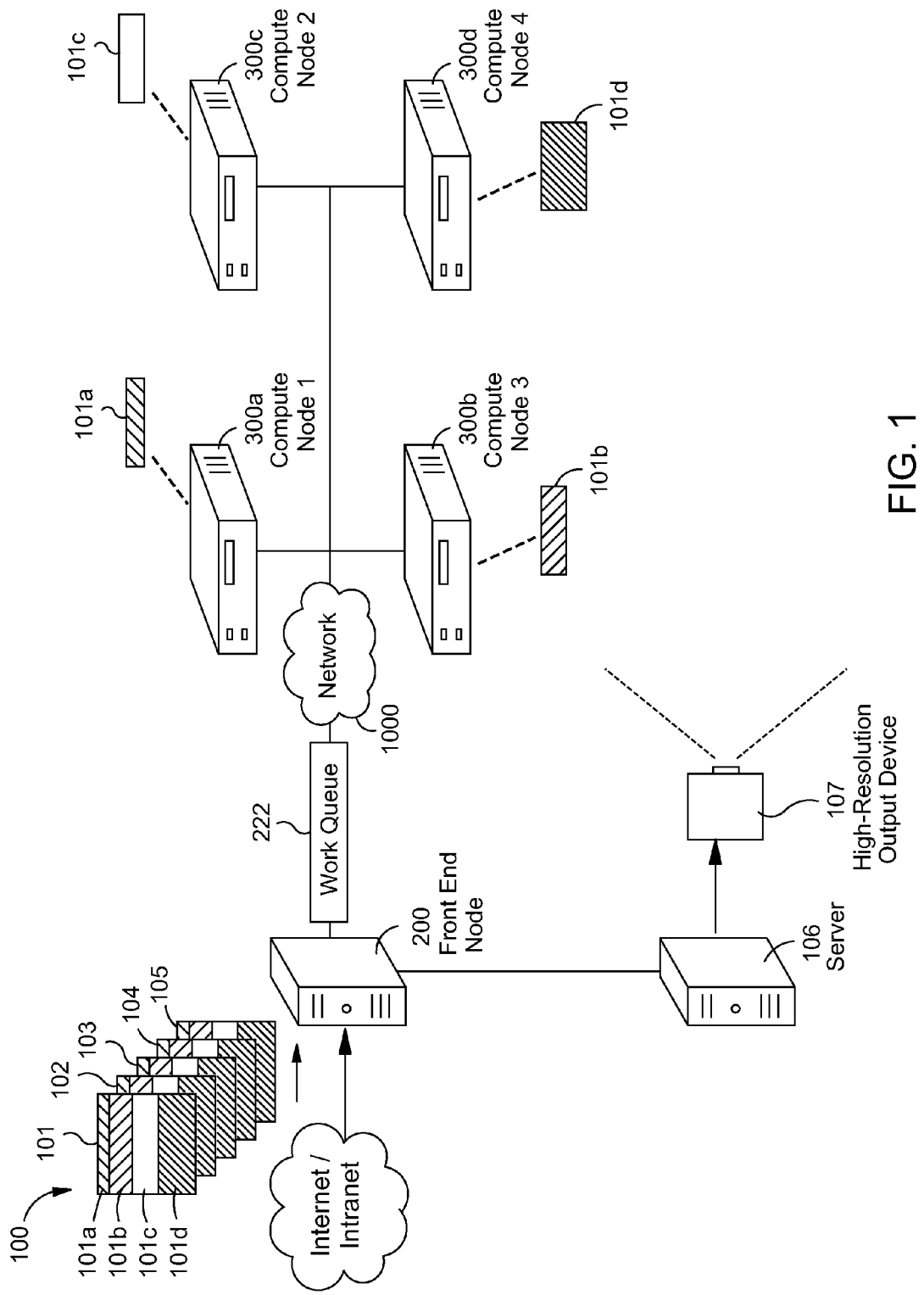
FIG. 1 is a representative view of a computing cluster relevant to one example embodiment.

FIG. 1 is a representative view of a computing cluster relevant to one example embodiment.

As shown in FIG. 1, front end node 200 is connected to compute nodes 300a to 300d via network 1000. The front end node 200 extracts and distributes tasks to the compute nodes 300a to 300d. As depicted diagrammatically in FIG. 1, front end node 200 is provided with multiple time-sequential frames of image data in a moving image 100, such as frames 101 to 105, for which extraction and distribution to compute nodes 300a to 300d is effected. The frames 101 to 105 are received in a work queue 222, where they are distributed and processed in the order received.

The present disclosure contemplates various numbers of compute nodes. Accordingly, more or fewer compute nodes may be implemented in the computing cluster, and the number of participating compute nodes might change during work.

In FIG. 1, front node 200 is depicted as receiving work, such as a moving image 100, via the Internet (or intranet) for processing. The front end node 200 divides each frame 101 to 105 into multiple tasks for distribution and processing by multiple compute nodes 300a to 300d, such that each frame 101 to 105 is processed by more than one compute node.

Thus, as depicted in FIG. 1, with respect to frame 101, the front end node 200 divides a plurality of tasks 101a to 101d, and distributes the divided tasks 101a to 101d to the compute nodes 300a to 300d for processing. As also depicted in FIG. 1, compute node 300a is assigned task 101a, compute node 300b is assigned task 101b, compute node 300c is assigned task 101c, and compute node 300d is assigned task 101d. The size of each divided task corresponds to a job load metric of the compute nodes that is assigned to execute that task, as discussed more fully below in connection with FIG. 5.

The compute nodes 300a to 300d transmit the results of processing to the front end node 200 upon completion of their assigned tasks. The front end node 200 receives responses from the compute nodes 300a to 300d, including results of processing, where the results may be transmitted to a server for further processing. According to the embodiment shown in FIG. 1, the front end node 200 transmits the results of processing to server 106, for display by the high-resolution output device 107.

The particular implementation, scale, and hardware of network 1000 may vary according to different embodiments. Thus, for example, network 1000 could be the Internet, a Local Area Network (LAN), Wide Area Network (WAN), Metropolitan Area Network (MAN), Personal Area Network (PAN), or combinations thereof. Network 1000 can be wired or wireless, and can be implemented, for example, as an Ethernet, Infiniband, Myrinet, Optical fiber, or Wireless LAN network. In addition, the network topology of network 1000 may also vary. Communication between the front end node 200 and the compute nodes 300a to 300d may be accomplished using an application programming interface (API), such as the Message Passing Interface (MPI), that allows computers to communicate with one another.

Figure 2:
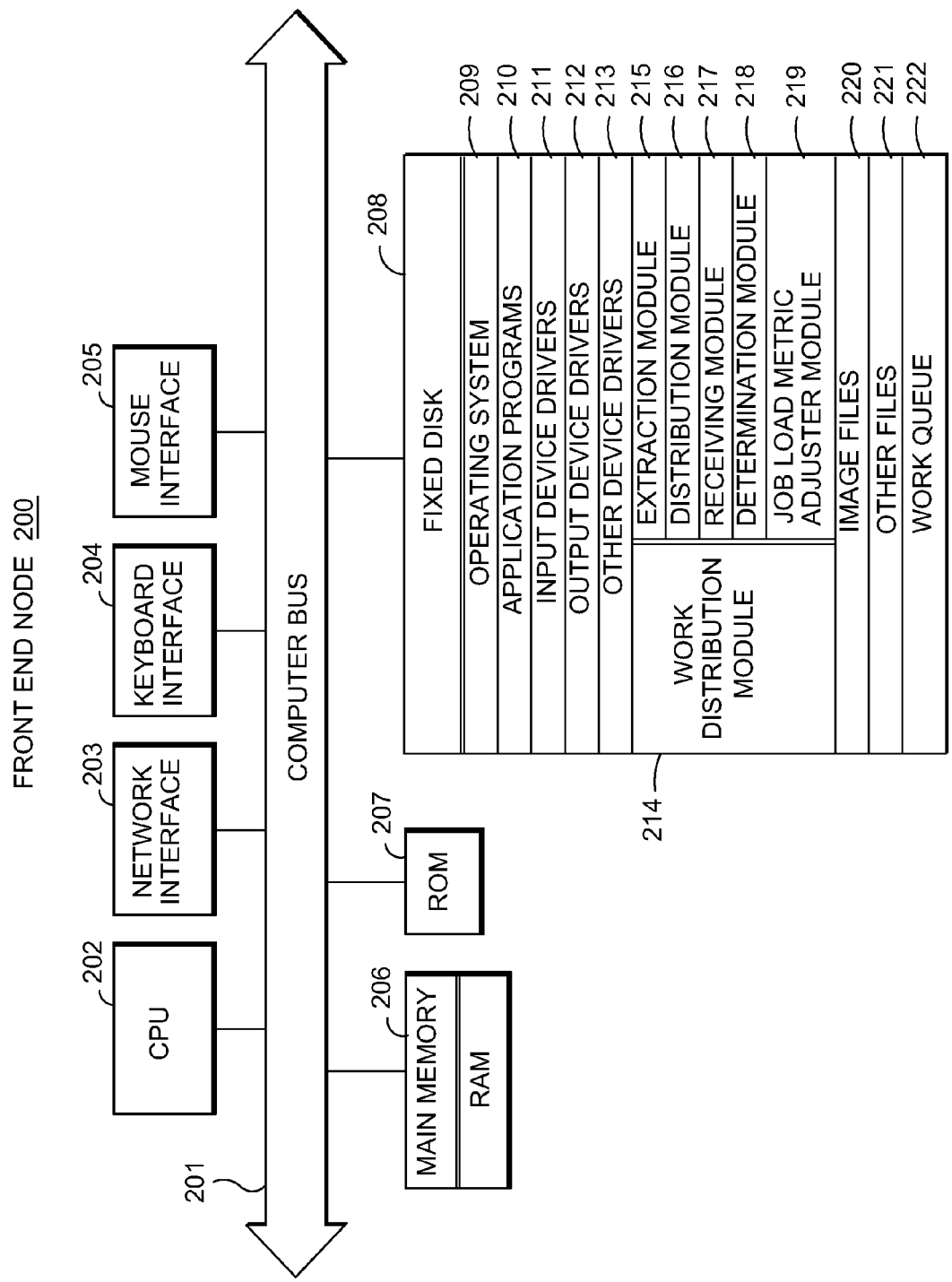
FIG. 2 is a detailed block diagram depicting the internal architecture of an example front end node.

FIG. 2 is a detailed block diagram depicting the internal architecture of an example front end node.

As shown in FIG. 2, front end node 200 includes central processing unit (CPU) 202 which interfaces with computer bus 201. Also interfacing with computer bus 201 are fixed disk 208 (e.g., a hard disk or other nonvolatile storage medium), network interface 203, keyboard interface 204, mouse interface 205, random access memory (RAM) 206 for use as a main run-time transient memory, read only memory (ROM) 207, and work distribution module 214. Front end node 200 uses network interface 203 to interface to network 1000.

RAM 206 interfaces with computer bus 201 so as to provide information stored in RAM 206 to CPU 202 during execution of the instructions in software programs, such as an operating system, application programs, the work distribution module, and device drivers. More specifically, CPU 202 first loads computer-executable process steps from fixed disk 208, or another storage device, into a region of RAM 206. CPU 202 can then execute the stored process steps from RAM 206 in order to execute the loaded computer-executable process steps. Data, or other information, is stored in RAM 206 and the data is accessed by CPU 202 during the execution of the computer-executable software programs, to the extent that such software programs have a need to access and/or modify the data.

As also shown in FIG. 2, fixed disk 208 is an example of a computer-readable storage medium that stores computer-executable process steps for operating system 209, and application programs 210, such as moving image manipulation programs. Fixed disk 208 also stores computer-executable process steps for device drivers for software interface to devices, such as input device drivers 211, output device drivers 212, and other device drivers 213. Image files 220 and other files 221 are stored for distribution to compute nodes for processing.

Fixed disk 208 also includes a work queue 222 that receives and stores work to be processed. The work stored in work queue 222 is distributed and processed in the order it is received.

Work distribution module 214 comprises computer-executable process steps stored on a computer-readable storage medium for execution by a processor, such as CPU 202, to extract tasks from work that is received by front end node 200, and to distribute those tasks to compute nodes for processing. Work distribution module 214 generally comprises an extraction module 215, a distribution module 216, a receiving module 217, a determination module 218, and a job load adjuster module 219. These modules are described in greater detail below in connection with FIG. 4.

The computer-executable process steps for work distribution module 214 may be configured as part of operating system 209, as part of an output device driver, such as a work distribution driver, or as a stand-alone application program. Work distribution module 214 may also be configured as a plug-in or dynamic link library (DLL) to the operating system, a device driver, or an application program.

Figure 3:
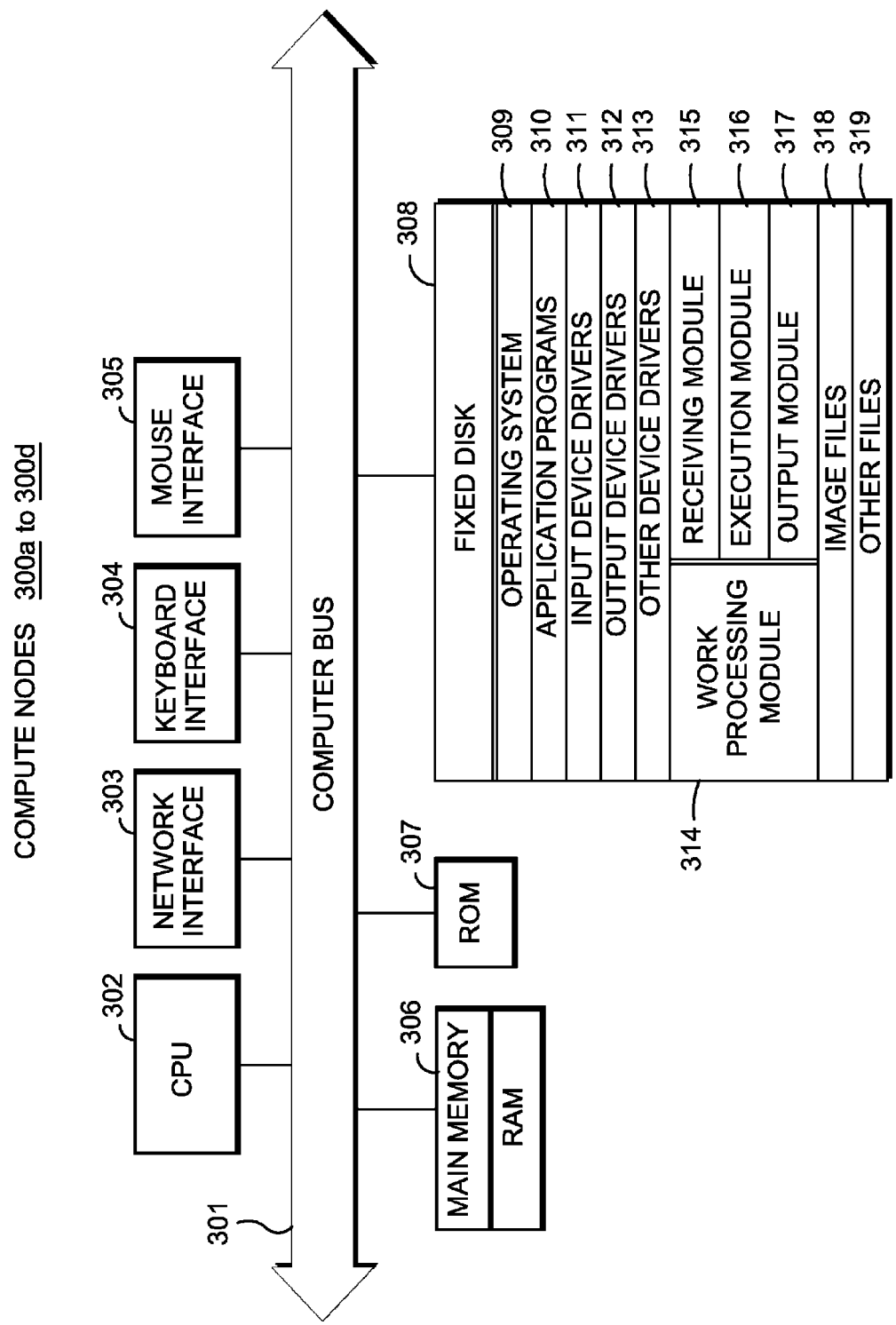
FIG. 3 is a detailed block diagram depicting the internal architecture of an example compute node.

FIG. 3 is a detailed block diagram depicting the internal architecture of an example compute node.

As shown in FIG. 3, a compute node includes central processing unit (CPU) 302 which interfaces with computer bus 301. Also interfacing with computer bus 301 are fixed disk 308 (e.g., a hard disk or other nonvolatile storage medium), network interface 303, keyboard interface 304, mouse interface 305, random access memory (RAM) 306 for use as a main run-time transient memory, read only memory (ROM) 307, and a work processing module 314. Network interface 303 is provided to interface to network 1000.

RAM 306 interfaces with computer bus 301 so as to provide information stored in RAM 306 to CPU 302 during execution of the instructions in software programs, such as an operating system, application programs, a work processing module, and device drivers. More specifically, CPU 302 first loads computer-executable process steps from fixed disk 308, or another storage device, into a region of RAM 306. CPU 302 can then execute the stored process steps from RAM 306 in order to execute the loaded computer-executable process steps. Data, or other information, is stored in RAM 306 and the data is accessed by CPU 302 during the execution of the computer-executable software programs, to the extent that such software programs have a need to access and/or modify the data.

As also shown in FIG. 3, fixed disk 308 is an example of a computer-readable storage medium that stores computer-executable process steps for operating system 309, and application programs 310, such as moving image manipulation programs. Fixed disk 308 also stores computer-executable process steps for device drivers for software interface to devices, such as input device drivers 311, output device drivers 312, and other device drivers 313.

Work processing module 314 comprises computer-executable process steps stored on a computer-readable storage medium for execution by a processor, such as CPU 302, to receive and execute tasks. Work processing module 314 generally comprises a receiving module 315, an execution module 316, and an output module 317. These modules are described in greater detail below in connection with FIG. 4.

The computer-executable process steps for work processing module 314 may be configured as part of operating system 309, as part of an output device driver, such as a work processing driver, or as a stand-alone application program. Work processing module 314 may also be configured as a plug-in or dynamic link library (DLL) to the operating system, a device driver, or an application program.

Figure 4:
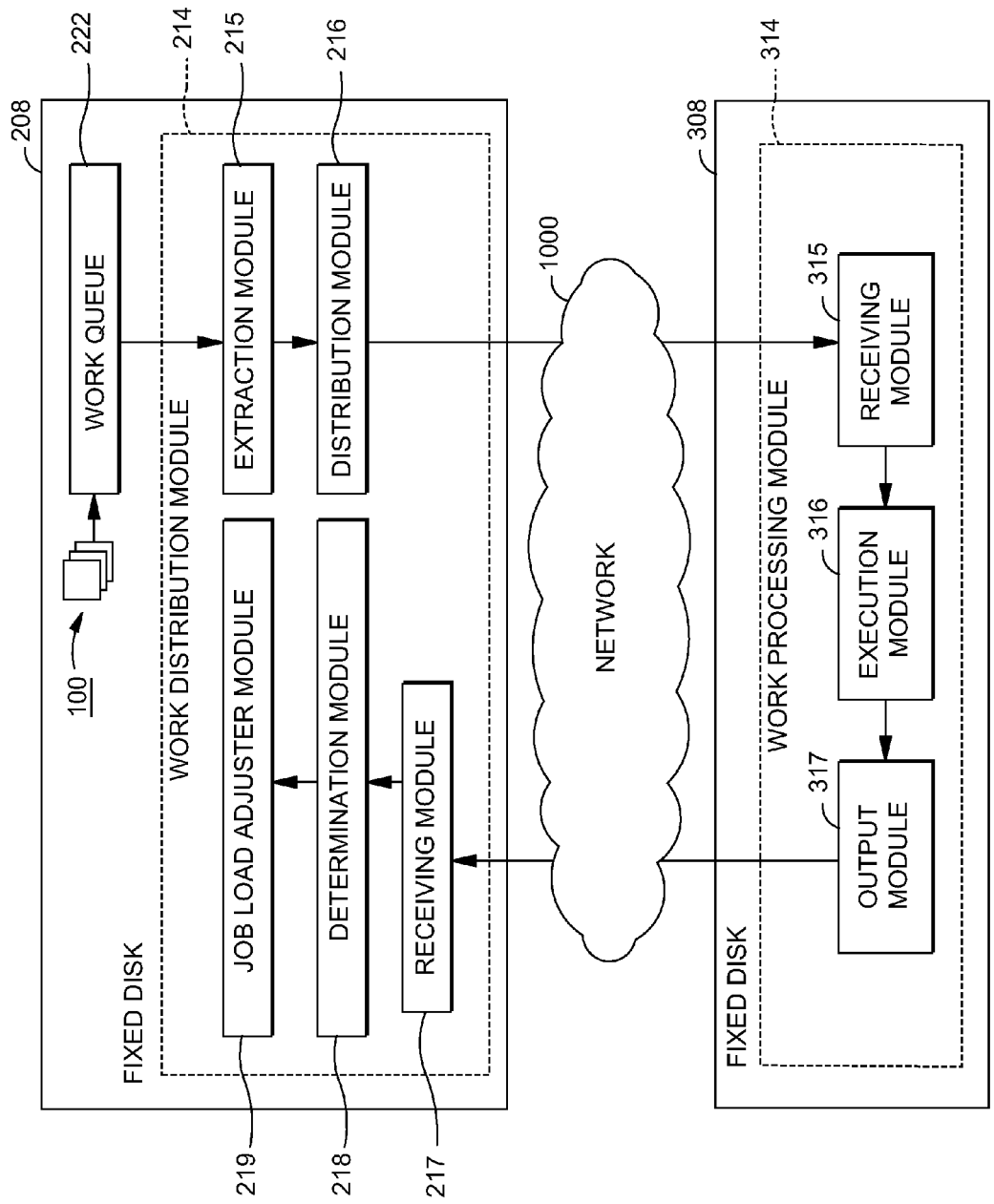
FIG. 4 illustrates example architecture for a work distribution module in a front end node and example architecture for a work processing module in a compute node, and interaction therebetween.

FIG. 4 illustrates example architecture for a work distribution module in a front end node and example architecture for a work processing module in a compute node, and interaction therebetween.

In particular, FIG. 4 illustrates one example of the work distribution module 214 in which the sub-modules of work distribution module 214 are stored in fixed disk 208. The example work distribution module 214 is constructed to distribute work from the front end node 200 to the compute nodes 300a to 300d over a network 1000 for processing. As shown in FIG. 4, the work distribution module 214 comprises an extraction module 215, a distribution module 216, a receiving module 217, a determination module 218, and a job load metric adjuster module 219. Each of these modules are computer-executable software code or process steps executable by a processor, such as CPU 202, and are stored on a computer-readable storage medium, such as fixed disk 208 or RAM 206. More or fewer modules may be used than shown in FIG. 4, and other architectures are possible.

As shown in FIG. 4, the work distribution module 214 includes an extraction module 215 constructed to extract tasks from the work received by front node 200, where the number of tasks corresponds to the number of nodes, and where the tasks are sized based on a job load metric of each of the nodes. The extraction module 215 is further constructed to extract tasks from the work received by front node 200, where the tasks are sized based on an adjusted job load metric of each of the compute nodes.

Work distribution module 214 also includes a distribution module 216 constructed to distribute the tasks to at least some of the nodes for processing.

In one example embodiment, the work available for distribution is dynamic in nature such that the amount of work available for distribution is received in work queue 222 on an ongoing basis, and where the distribution module 216 is further constructed to distribute the work available for distribution in the order received. For example, as shown in FIG. 1, the front end node 200 receives a moving image 100 via the Internet (or intranet) on an ongoing basis, and stores the received frames 101 to 105 in work queue 222. The front end node 200 distributes the frames 101 to 105 from the work queue 222, for processing by the compute nodes 300a to 300d, in the order received.

In another example embodiment, the distribution module 216 of front end node 200 is further constructed to transmit a qualification task for execution by each node, where the qualification task measures capabilities of core elements in a node, where an influence factor is assigned to each core element, and where the influence factor is used to adjust the weight of the core element on a capability measurement of the node. Qualification tasks are described in more detail below, in connection with FIG. 5.

The work distribution module 214 includes a receiving module 217 constructed to receive results outputted by the compute nodes upon execution of their assigned tasks.

Work distribution module 214 further includes a determination module 218 constructed to determine a time difference between a response from a node that is first to complete its task and a response from a node that is last to complete its task, and to determine whether such time difference exceeds a predefined threshold.

In addition, work distribution module 214 includes a job load metric adjuster module 219 constructed to adjust the job load metric of at least some of the nodes in response to a determination that the time difference between a response from a node that is first to complete its task and a response from a node that is last to complete its task exceeds a predefined threshold.

In one example embodiment, the job load metric adjuster module 219 is further constructed to calculate an initial job load metric for each compute node using the results from a qualification task.

In another example embodiment, the job load metric adjuster module 219 is further constructed to leave the job load metric unadjusted in response to a determination that the time difference between a response from a node that is first to complete its task and a response from a node that is last to complete its task does not exceed a predefined threshold.

FIG. 4 also illustrates an example work processing module 314 in which sub-modules of the work processing module 314 are stored in fixed disk 308. Specifically, FIG. 4 illustrates one example of the work processing module 314 constructed to receive tasks from front end node 200 over network 1000, and to execute the received tasks. As shown in FIG. 4, the work processing module 314 comprises a receiving module 315, an execution module 316, and an output module 317. Each of these modules are computer-executable software code or process steps executable by a processor, such as CPU 302, and are stored on a computer-readable storage medium, such as fixed disk 308 or RAM 306. More or fewer modules may be used than shown in FIG. 4, and other architectures are possible.

As shown in FIG. 4, the work processing module 314 includes a receiving module 315 constructed to receive tasks from front end node 200 for processing.

The work processing module 314 also includes an execution module 316 constructed to execute tasks received from the front end node 200.

The work processing module 314 also includes an output module 317 constructed to output the results of the executed tasks to the front end node 200.

Figure 5:
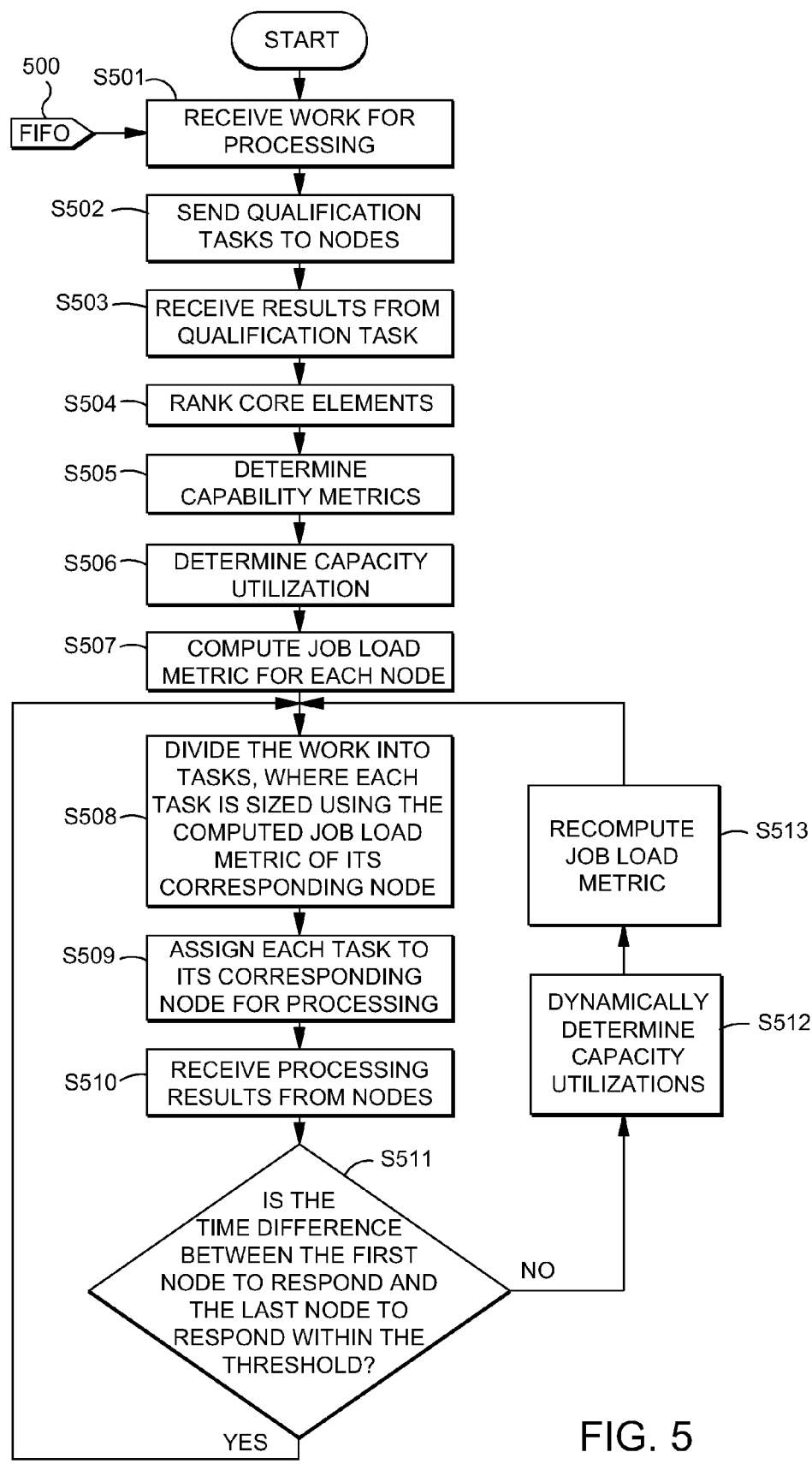
FIG. 5 is a flowchart illustrating an example process for explaining task allocation.

FIG. 5 is a flowchart illustrating an example process for explaining task allocation.

Briefly, in FIG. 5, work is distributed amongst a plurality of nodes in a distributed computing environment. A first plurality of tasks is extracted from the work, where the number of tasks in the first plurality of tasks is selected in correspondence to the number of nodes, and where sizes of the tasks in the first plurality of tasks are sized based on a job load metric of each of the nodes. The first plurality of tasks is distributed to at least some of the nodes for processing. A determination is made whether a time difference between a response from a node that is first to complete its task and a response from a node that is last to complete its task exceeds a predefined threshold. The job load metric of at least some of the nodes is adjusted in response to a determination that the time difference exceeds the predefined threshold. A second plurality of tasks is extracted from the work, where the number of tasks in the second plurality of tasks is selected in correspondence to the number of nodes, and where sizes of the tasks in the second plurality of tasks are sized based on the adjusted job load metric of each of the nodes. The second plurality of tasks is distributed to at least some of the nodes for processing.

In more detail, the process in the front end node 200 starts with step 501, where the front end node 200 receives work to be processed by the compute nodes. As shown in FIG. 1, the front end node 200 receives work via a network, such as the Internet (or intranet). The front end node 200 may receive work from a single source or from multiple sources, and each source may transmit different types of work to be processed. For example, one source may transmit multiple time-sequential 4K-sized frames of a video stream for post-processing, another source may transmit a stream of images from security cameras for face detection purposes, and third source may transmit a high-definition video stream for special effects processing. Each stream of work is collected in a work queue 222, and is distributed by the front end node 200 to the compute nodes 300a to 300d on a first-in, first-out (FIFO) basis.

In step 502, the distribution module 216 of front end node 200 transmits a qualification task for execution by each compute node 300a to 300d, where the qualification task measures capabilities of core elements in a compute node. In this example, six different capabilities are measured: the type of network interconnect ($I_E$), the nature and power of the CPU ($C_E$), the nature and power of the GPU ($G_E$), the capabilities of storage devices ($S_E$), the capabilities of the system memory ($M_E$), and system bus performance ($B_E$). More precisely, the type of network interconnect $I_E$ may distinguish between Ethernet, Infiniband, Myrinet, Optical fiber, or copper wire. The nature and power of the CPU $C_E$ may be determined using the clock frequency, cache size, and processing cores. Similarly, the nature and power of the GPU $G_E$ may be determined using the clock frequency, device memory size, and processing cores. The capabilities of the storage devices $S_E$ may be established based on storage device capacity, buffer size, and data throughput. System memory $M_E$ capabilities may be based on the clock frequency and storage capacity of the system memory. Finally, the performance of the system bus $B_E$ may be based on the maximum throughput of the bus.

The present disclosure contemplates modifying the qualification task to measure capabilities of other core elements in addition to the core elements described above, thereby allowing measurement of core elements that are relevant to a particular type of work.

In one example embodiment, the distribution module 216 of front end node 200 tailors the influence factors in correspondence to the nature of the work. For example, a compute environment requiring a large number of CPU-intensive transactions would typically place most of the demand on the CPU and the system memory, followed by network bandwidth and bus speed, with the storage device and the GPU having the least amount of influence. As discussed in more detail below in connection with step 505, in this example, $C_E$ and $M_E$ would be assigned the highest influence factors, with $I_E$ and $B_E$ having smaller influence factors, and with $S_E$ and $G_E$ having the lowest influence factors. According to the embodiment, the value of each influence factor is set manually. However, the present disclosure also contemplates determining and setting each influence factor automatically using heuristic methods, such as machine learning and data mining.

In step 503, the receiving module 217 of front end node 200 receives the results from the executed qualification task, from each compute node 300a to 300d. The qualification task results are stored for use in calculating a job load metric for the compute nodes, as discussed more fully in step 505. The following table illustrates example core element capability measurements that were generated upon execution of a qualification task by compute nodes 300a to 300d:

TABLE 1

Example Core Element Measurement

| Node | $I_E$ | $C_E$ | $G_E$ | $S_E$ | $M_E$ | $B_E$ |
|---|---|---|---|---|---|---|
| Node 1 | 100 Mbps | 3 GHz/512K/1 | 64/128M/1 GHz | 0.2 Gb/8M/200 GB | 800 MHz/1 GB | 0.5 Gbps |
| Node 2 | 1 Gbps | 1.2 GHz/1M/4 | 32/128M/1 GHz | 0.15 Gb/16M/500 GB | 1000 MHz/4 GB | 2 Gbps |
| Node 3 | 1 Gbps | 1.1 GHz/2M/2 | 256/1G/1.1 GHz | 0.2 Gb/32M/750G | 1200 MHz/8 GB | 1 Gbps |
| Node 4 | 20 Gbps | 2 GHz/2M/6 | 312/1.9G/1 GHz | 0.3 Gb/64M/400 GB | 1600 MHz/16 GB | 1 Gbps |

In step 504, the job load metric adjuster module 219 of front end node 200 ranks the core elements in proportion to one another, as shown in Table 2.

The following table illustrates an example proportionate ranking of core elements $C_E$, $M_E$, $I_E$, and $B_E$ using the core element capability measurements determined in steps 502 and 503, as shown in Table 1.

TABLE 2

Example Proportionate Rankings for Core Elements

| Node | $C_E$ | $M_E$ | $I_E$ | $B_E$ |
|---|---|---|---|---|
| Node 1 | 0.10 | 0.05 | 0.05 | 0.16 |
| Node 2 | 0.30 | 0.20 | 0.20 | 0.40 |
| Node 3 | 0.20 | 0.30 | 0.20 | 0.22 |
| Node 4 | 0.40 | 0.45 | 0.55 | 0.22 |

In step 505, the job load adjuster module 219 of front end node 200 computes a capability metric (CM) for each core element using the proportionate ranking data for the core elements shown in Table 2. The capability metric (CM) is determined as follows:

$$CM(X_E) = X_E \times I_F(X_E) \quad \text{Equation 1}$$

where CM is capability metric, $X_E$ is the core element proportionate ranking, and $I_F$ is the influence factor assigned to the core element.

Using Equation 1, the front end node 200 determines a capability metric for core elements $C_E$, $M_E$, $I_E$, and $B_E$ using the core element data from Table 2 and an influence factor ($I_F$). For simplicity purposes, the present example omits core element data for $S_E$ and $G_E$ from Table 2 in order to deemphasize their role in the allocation of tasks in a CPU-intensive environment, where the capabilities of $S_E$ and $G_E$ would typically be less significant.

In one example embodiment, an influence factor is assigned to each core element, where the influence factor is used to adjust the weight of the core element on a capability measurement of the compute node.

The influence factor is tailored to allow the front end node 200 to assign appropriate weights to the core elements, thereby allowing the front end node 200 to manipulate the amount of influence a particular core element has on the capability metric and, ultimately, the job load metric, in correspondence to the nature of the work. For example, a compute environment requiring a large number of CPU-intensive transactions would typically place most of the demand on the CPU and the system memory. Additional factors, such as network bandwidth and bus speed, would also play a role in such a scenario, since the ability to transfer data quickly between processors and compute nodes is needed. In such an environment, the highest influence factor would be assigned to the CPU ($C_E$) and system memory ($M_E$) core elements, followed by the network interconnects ($I_E$) core element and bus speed ($B_E$). The following table shows example capability metric values for core elements $C_E$, $M_E$, $I_E$, and $B_E$, that were calculated using Equation 1 and the core element data from Table 2, where core elements $C_E$ and $M_E$ were assigned an influence factor of 0.3, core elements $I_E$ and $B_E$ were assigned influence factors 0.2 and 0.15, respectively.

TABLE 3

Example Capability Metric for Core Elements

| Node | CM ($C_E$) | CM ($M_E$) | CM ($I_E$) | CM ($B_E$) |
|---|---|---|---|---|
| Node 1 | 0.03 | 0.015 | 0.01 | 0.024 |
| Node 2 | 0.09 | 0.06 | 0.04 | 0.06 |
| Node 3 | 0.06 | 0.09 | 0.04 | 0.033 |
| Node 4 | 0.12 | 0.135 | 0.11 | 0.033 |

Once the capability metrics have been determined, in step 506, the front end node 200 determines the capacity utilization for core elements $C_E$, $M_E$, $I_E$, and $B_E$ using the following equation:

$$CU(X_E) = \frac{CM(X_E)}{\sum_{cn=1}^{n} CM(X_E)} \times 100 \quad \text{Equation 2}$$

where CU is the capacity utilization, CM is the capability metric, and $X_E$ is the core element proportionate ranking.

The front end node 200 uses the capacity utilization metrics to determine a job load metric for each compute node. The job load metric of each compute node is used to allocate the tasks to the compute nodes, where the allocation is performed so as to achieve near full utilization of the core elements. As discussed above, an environment having a large number of CPU-intensive transactions would typically be heavily dependent on the CPU ($C_E$), system memory ($M_E$), network interconnects ($I_E$), and bus speed ($B_E$). Thus, the capacity utilization metric would aid in allocating the tasks so that the $C_E$, $M_E$, $I_E$, and $B_E$ core elements are utilized at or near 100 percent. The following table shows example capacity utilization metrics for core elements $C_E$, $M_E$, $I_E$, and $B_E$ that were calculated using Equation 2 in combination with capability metric data from Table 3.

TABLE 4

Example Capacity Utilization of Core Elements

| Node | CU ($C_E$) % | CU ($M_E$) % | CU ($I_E$) % | CU ($B_E$) % |
|---|---|---|---|---|
| Node 1 | 10 | 5 | 5 | 16 |
| Node 2 | 30 | 20 | 20 | 40 |
| Node 3 | 20 | 30 | 20 | 22 |
| Node 4 | 40 | 45 | 55 | 22 |

In step 507, the front end node 200 calculates a job load metric for each compute node 300a to 300d by using the results from the executed qualification task. Specifically, a job load metric is approximated using the following equation:

$$JL_n \cong \sum_{CoreElement=1}^{6} CU(X_E) \times I_F(X_E) \qquad \text{Equation 3}$$

where JL is the job load metric, CU is the capacity utilization, $X_E$ is the core element proportionate ranking, $I_F$ is the influence factor assigned to the core element, and where the summation is taken over "6" since, in this example, there are six core elements.

A job load metric is calculated for each compute node 300*a* to 300*d* using Equation 3 and the capacity utilization values that were determined in step 506. In particular, the job load metrics for the compute nodes 300*a* to 300*d* are used by the front end node 200 to size the tasks extracted from the work.

In step 508, the extraction module 215 of front end node 200 extracts a first plurality of tasks, where the number of tasks in the first plurality of tasks is selected in correspondence to the number of nodes, and where sizes of the tasks in the first plurality of tasks are sized based on a job load metric of each of the compute nodes. In one example, the extraction module 215 of front end node 200 divides the work into four tasks, one for each compute node 300*a* to 300*d*. The sizes of the divided tasks correspond to the job load metric of the compute node assigned to execute that task. In other words, the size of a task assigned to compute node 300*a* would be based on a job load metric that was determined for compute node 300*a*. Similarly, the sizes of tasks assigned to compute nodes 300*b*, 300*c* and 300*d*, is based on a job load metric that was determined for compute nodes 300*b*, 300*c* and 300*d*, respectively.

In step 509, the distribution module 216 of front end node 200 distributes the first plurality of tasks to at least some of the nodes for processing.

In step 510, the receiving module 217 of front end node 200 receives the executed task results that are outputted by output module 317 of compute nodes 300*a* to 300*d*. The front end node 200 may then store the task results in a database or may send the results to another server 106 for further processing and display, as depicted in FIG. 1.

In step 511, the determination module 218 of front end node 200 determines whether a time difference between a response from a node that is first to complete its task and a response from a node that is last to complete its task exceeds a predefined threshold. If the time difference exceeds the predefined threshold, the front end node 200 proceeds to step 512. Otherwise, if the time difference does not exceed the predefined threshold, the front end node proceeds to step 508, where the extraction module 215 of front end computer 200 continues processing work from work queue 222.

As suggested above, the time difference between a response from a node that is first to complete its task and a response from a node that is last to complete its task is a measurement that is used to gauge how far apart in time the responses are for the best performing compute node and for the worst performing compute node. Ideally, the time difference between responses from the best performing compute node and the worst performing compute node should be minimal, which would indicate that all of the compute nodes are being utilized at near full potential. However, a significant time difference between responses from the best performing node and the worst performing node would suggest that the best performing compute node may be under-worked, as indicated by its fast response, or that the worst performing compute node may be over-worked, as indicated by its slow response.

The predefined threshold is used to determine whether the time difference between responses from the best performing compute node and the worst performing compute node falls within an acceptable duration. A time difference that exceeds the predefined threshold will trigger an adjustment of the job load metric for the compute nodes. Therefore, setting the predefined threshold too high may result in the job load metric not being adjusted, and may therefore result in a sub-optimal utilization of the compute nodes. For example, if the predefined threshold is defined as 2.0 seconds, and the time difference between the first node to respond and the last node to respond never exceeds 2.0 seconds, then adjustment of the job load metric will not be triggered. In this example, the front end node 200 will size the tasks using the unadjusted job load metric each time tasks are extracted from the work, which may result in a sub-optimal sizing of the tasks. Alternatively, setting the predefined threshold too low may result in the job load metric being adjusted too often. Since adjusting the job load metric requires the front end node 200 to perform additional operations, frequent adjustment of the job load metric may disrupt efficient operation of the computing cluster. For example, if the predefined threshold is defined as 0.1 seconds, and the time difference between the first node to respond and the last node to respond frequently exceeds 0.1 seconds, then adjustment of the job load metric would be triggered each time tasks are extracted from the work. Such a situation is ordinarily not desirable because it affects the efficient operation of the computing cluster. Thus, setting the predefined threshold value to an acceptable value is helpful in maintaining efficiency. According to the embodiment, the threshold is set manually. However, the present disclosure also contemplates determining and setting the predefined threshold automatically using heuristic methods, such as machine learning and data mining.

In steps 512 and 513, the job load adjuster module 219 of front end node 200 adjusts the job load metric of at least some of the nodes in response to a determination that the time difference between a response from a node that is first to complete its task and a response from a node that is last to complete its task exceeds the predefined threshold.

In the example embodiment described herein, adjusting the job load metric comprises dynamically adjusting capacity utilizations for at least some of the core elements in a node during runtime, and adjusting the job load metric using the dynamically adjusted capacity utilizations of the core elements in the node.

Accordingly, in step 512, the job load adjuster module 219 of front end node 200 dynamically adjusts capacity utilizations for at least some of the core elements in each compute node. The adjusted capacity utilizations are used to adjust the job load metric for at least some of the nodes, as discussed more fully in step 513.

According to the example embodiment described herein, dynamically adjusting capacity utilizations for at least some of the core elements in a node during runtime comprises reducing the capacity utilization for a core element assigned the highest influence factor in the node that is last to complete its task, by a predetermined amount, and increasing the capacity utilization for the core element assigned the highest influence factor in the remaining nodes, where the amount increased for each node is proportionate to the existing capacity utilizations for the core element assigned the highest influence factor in the remaining nodes, and where the cumulative increase amongst the remaining nodes is equal to the amount that was reduced in the node that is last to complete its task.

The capacity utilization adjustment is initially made in the node that is last to complete its task, i.e., the last responding node, as determined by the timing of the responses that were received in step 510. In particular, the capacity utilization for the core element assigned the highest influence factor is reduced by a predetermined amount in the last responding node. According to this example embodiment, in situations where the highest influence factor is shared amongst multiple core elements, the capacity utilization adjustment is performed for only one of those core elements. In addition, the predetermined amount, which can be any desired value, is typically set to a low number in order to prevent excessive fluctuations in the job load metrics of the compute nodes.

The amount reduced from the capacity utilization for the core element assigned the highest influence factor is redistributed to the remaining compute nodes by increasing the capacity utilization for the same core element in the remaining compute nodes. In particular, the amount increased in each compute node is proportionate to the existing capacity utilization for the core element assigned the highest influence factor in each compute node, as explained further in the example below. In addition, the cumulative increase amongst the remaining compute nodes is equal to the amount that was reduced in the last responding node.

For demonstrative purposes, the following example table shows a list of compute nodes, along with their task completion times and the capacity utilization for the core element assigned the highest influence factor, the CPU ($C_E$):

TABLE 5

Example Node Response Times and Capacity Utilizations

| Node | Task Completion Time | CU ($C_E$) % |
|---|---|---|
| Node 1 | 0 sec | 30 |
| Node 2 | 2 sec | 10 |
| Node 3 | 3 sec | 10 |
| Node 4 | 10 sec | 50 |

As shown in Table 5, the task completion times for Nodes 1 to 4 are 0 seconds, 2 seconds, 3 seconds, and 10 seconds, respectively. According to Table 5, Node 4, which took 10 seconds to complete its assigned task, is the last responding node. Therefore, the capacity utilization for the core element assigned the highest influence factor in Node 4, i.e., $C_E$, is reduced by a predetermined amount, which, in this example, is 5 percent. Consequently, the capacity utilization for $C_E$ in Node 4 is reduced to 45 percent and the amount that was reduced from Node 4, i.e., 5 percent, is redistributed to the remaining compute nodes. The redistribution is accomplished by adjusting the capacity utilization for the core element $C_E$ in the remaining nodes in proportion to the existing capacity utilization for core element $C_E$. Since Nodes 1 to 3 have an existing $C_E$ capacity utilization of 30 percent, 10 percent, and 10 percent, respectively, the redistribution of the amount reduced in the last responding node, i.e., 5 percent, is performed by distributing 3 percent to Node 1, 1 percent to Node 2, and 1 percent to Node 3. The example table below shows the adjusted capacity utilizations for $C_E$:

TABLE 6

Example Adjusted Capacity Utilizations

| Node | CU ($C_E$) % |
|---|---|
| Node 1 | 33 |
| Node 2 | 11 |

TABLE 6-continued

Example Adjusted Capacity Utilizations

| Node | CU ($C_E$) % |
|---|---|
| Node 3 | 11 |
| Node 4 | 45 |

These dynamically adjusted capacity utilizations are used to adjust the job load metric of each compute node, as discussed in step 513, so that the next set of tasks can be sized and distributed in a manner that facilitates near full utilization of the compute nodes.

The present disclosure contemplates dynamically adjusting the capacity utilization for a plurality of core element in each compute node, where the dynamically adjusted capacity utilizations of the plurality of core elements are used to adjust the job load metric of each compute node.

In step 513, the job load adjuster module 219 of front end node 200 adjusts the job load metric for at least some of the nodes. In particular, the job load adjuster module 219 of front end node 200 re-computes the job load metric for the compute nodes 300a to 300d using the dynamically adjusted capacity utilizations of the core elements.

The re-computed job load metrics for the compute nodes 300a to 300d are used in step 508, where the extraction module 215 of front end node 200 extracts a second plurality of tasks from the work, where the number of tasks in the second plurality of tasks is selected in correspondence to the number of nodes, and where sizes of the tasks in the second plurality of tasks are sized based on the adjusted job load metric of each of the nodes. In step 509, the distribution module 216 of front end node 200 distributes the second plurality of tasks to at least some of the nodes for processing. Steps 510 to 511 are performed in the same manner as described above.

In one example embodiment described herein, in response to a determination that the time difference does not exceed the predefined threshold, a second plurality of tasks is extracted from the work, where the number of tasks in the second plurality of tasks is selected in correspondence to the number of nodes, and where sizes of the tasks in the second plurality of tasks remain based on the unadjusted job load metric of each of the nodes; and the second plurality of tasks is distributed to some of the nodes for processing.

Thus, referring back to step 511, if the time difference does not exceed the predefined threshold, the front end node proceeds to step 508, where the extraction module 215 of front end node 200 extracts a second plurality of tasks from the work, where the number of tasks in the second plurality of tasks is selected in correspondence to the number of nodes, and where sizes of the tasks in the second plurality of tasks remain based on the unadjusted job load metric of each of the nodes. In step 509, the distribution module 216 of front end node 200 distributes the second plurality of tasks to some of the nodes for processing. Steps 510 and 511 are performed in the same manner as described above.

Figure 6:
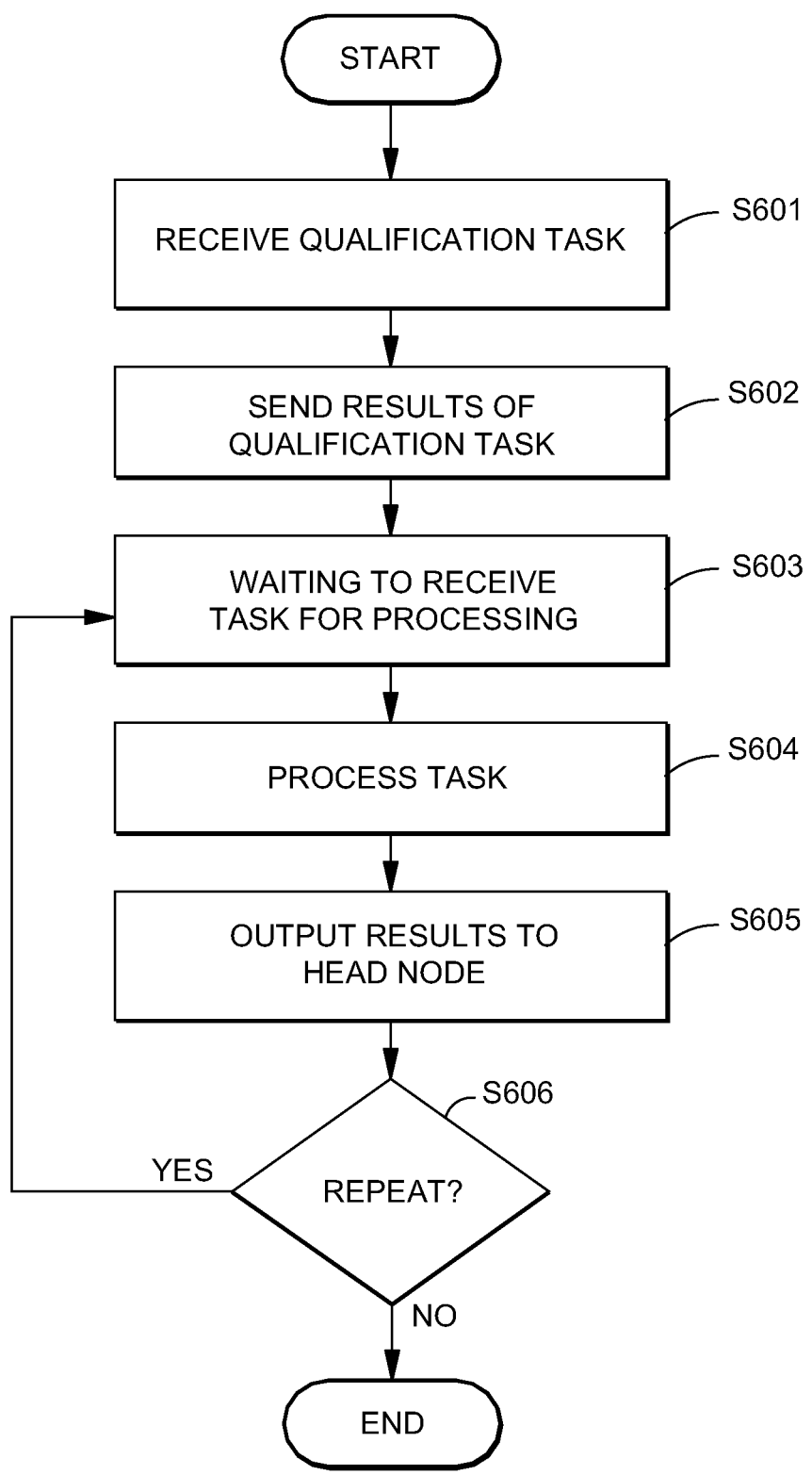
FIG. 6 is a flowchart illustrating an example process for explaining task execution.

FIG. 6 is a flowchart illustrating an example process for explaining task execution.

The compute nodes 300a to 300d begin the task execution process with step 601, where the receiving module 315 of the compute node receives a qualification task from front end node 200. As discussed in connection with FIG. 5, the qualification task is used to measure capabilities of core elements in a node.

In step 602, the compute nodes 300a to 300d execute the qualification task and transmit results of the qualification task to front end node 200.

In step 603, the compute nodes 300a to 300d wait to receive a task for execution from the front end node 200.

In step 604, the processing module 316 of compute nodes 300a to 300d processes the task that was received in step 603.

In step 605, the output module 317 of compute nodes 300a to 300d outputs the processing results to the front end node 200.

Once a task has completed, the process continues to step 606, where the receiving module 315 of compute nodes 300a to 300d determines if the compute node should continue to receive and process further tasks. Specifically, the process makes this determination by evaluating whether the compute node is functionally able to continue receiving and processing tasks. For example, the compute node may not be functionally able to continue receiving and processing tasks if the compute node needs to be taken offline for repair. If a determination is made that the compute node is functionally able to receive and process further tasks, the compute node proceeds to step 603, and waits to receive the next task for processing. Otherwise, the compute node ends the reception process.

Figure 7:
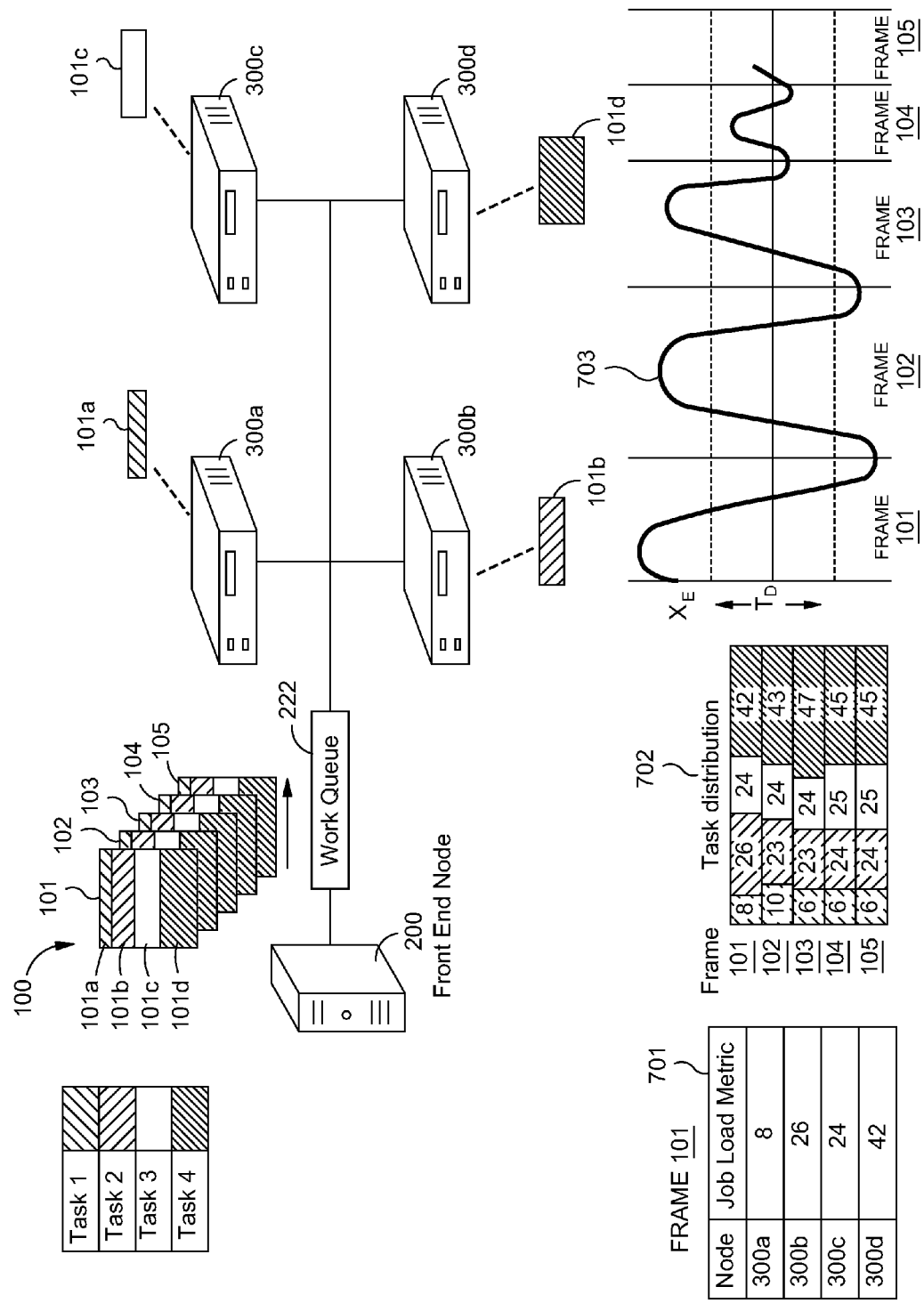
FIG. 7 is a view for explaining the allocation of tasks for successive frames of image data in moving image data.

FIG. 7 is a view for explaining an example allocation of tasks for moving image data.

As shown in FIG. 7, the front end node 200 is connected to compute nodes 300a to 300d. The front end node 200 extracts and distributes tasks to the compute nodes 300a to 300d. As depicted diagrammatically in FIG. 7, front end node 200 has multiple time-sequential frames of a moving image 100 for which extraction and distribution to compute nodes 300a to 300d is effected. FIG. 7 also depicts a job load metric table 701, a task distribution diagram 702, and a time difference monitor 703.

In FIG. 7, the front end node 200 begins by extracting a first plurality of tasks 101a to 101d from frame 101, where the number of tasks in the first plurality of tasks is selected in correspondence to the number of compute nodes 300a to 300d, and where sizes of the tasks in the first plurality of tasks are sized based on a job load metric of each of the compute nodes 300a to 300d. The front end node 200 distributes the extracted tasks 101a to 101d to the compute nodes 300a to 300d for processing.

The sizes of tasks 101a to 101d are based on a job load metric of each of the compute nodes 300a to 300d. The calculation of a job load metric for compute nodes 300a to 300d is discussed more thoroughly in step 507 of FIG. 5. As shown in the job load metric table 701, the job load metric for compute nodes 300a to 300d is 8, 26, 24 and 42, respectively. Accordingly, the front end node 200 sizes tasks 101a to 101d as 8, 26, 24 and 42, respectively, such that the size of each task corresponds to the job load metric for the compute node assigned to execute that task. Thus, the size of task 101a corresponds to the job load metric of compute node 300a (i.e., "8"), the size of task 101b corresponds to the job load metric of compute node 300b (i.e., "26"), the size of task 101c corresponds to the job load metric of compute node 300c (i.e., "24"), and the size of task 101d corresponds to the job load metric of compute node 300d (i.e., "42").

Upon completion of tasks 101a to 101d, the front end node 200 determines whether a time difference between a response from a node that is first to complete its task and a response from a node that is last to complete its task exceeds a predefined threshold. As shown in the time difference monitor 703 in connection with frame 101, the time difference between a response from a node that is first to complete its task and a response from a node that is last to complete its task has exceeded the predefined threshold $T_D$. In this example, the time difference between a response from compute node 300a, which was the first to complete its task 101a, and a response from compute node 300b, which was the last to complete its task 101b, exceeded the predefined threshold $T_D$. Accordingly, in response to the time difference exceeding the predefined threshold $T_D$, the front end node 200 adjusts the job load metric of at least some of the compute nodes. Specifically, the job load metric of the compute nodes is adjusted by dynamically adjusting the capacity utilizations of each core element in each compute node during runtime, and adjusting the job load metric using the dynamically adjusted capacity utilizations of the core elements in the node, so that the next set of tasks can be sized and distributed in a manner that facilitates near full utilization of the compute nodes. Next, the front end node 200 extracts a second plurality of tasks 102a to 102d (not shown) from frame 102, where the number of tasks in the second plurality of tasks is selected in correspondence to the number of compute nodes, and where sizes of the tasks in the second plurality of tasks are sized based on the adjusted job load metric of each of the compute nodes. The sizes of tasks 102a to 102d are based on an adjusted job load metric of each of the compute nodes 300a to 300d. Accordingly, the front end node 200 sizes tasks 102a to 102d as 10, 23, 24 and 43, respectively. The front end node 200 distributes the second plurality of tasks 102a to 102d to compute nodes 300a to 300d for processing.

Once execution of the second plurality of tasks 102a to 102d is complete, the front end node 200 again determines whether a time difference between a response from a compute node that is first to complete its task and a response from a compute node that is last to complete its task exceeds a predefined threshold. In this example, the time difference between a response from compute node 300d, which was the first to complete its task 102d, and a response from compute node 300a, which was the last to complete its task 102a, exceeded the predefined threshold $T_D$, as shown in the time difference monitor 703 in connection with frame 102. Accordingly, the front end node 200 adjusts the job load metric of at least some of the compute nodes. Specifically, the job load metric of the compute nodes is adjusted by dynamically adjusting the capacity utilizations of each core element in each compute node during runtime, and adjusting the job load metric using the dynamically adjusted capacity utilizations of the core elements in the node, so that the next set of tasks can be sized and distributed in a manner that facilitates near full utilization of the compute nodes. Next, the front end node 200 extracts a third plurality of tasks 103a to 103d (not shown) from frame 103, where the number of tasks in the third plurality of tasks is selected in correspondence to the number of compute nodes, and where sizes of the tasks in the third plurality of tasks are sized based on the adjusted job load metric of each of the compute nodes. Accordingly, the front end node 200 sizes tasks 103a to 103d as 6, 23, 24, and 47, respectively. The front end node 200 distributes the third plurality of tasks 103a to 103d to compute nodes 300a to 300d for processing.

Upon completion of the third plurality of tasks 103a to 103d, the front end node 200 again determines whether a time difference between a response from a compute node that is first to complete its task and a response from a compute node that is last to complete its task exceeds a predefined threshold. As shown in the time difference monitor 703 in connection with frame 103, in this example, the time difference between a response from compute node 300c, which was the first to complete its task 103c, and a response from compute node 300d, which was the last to complete its task 103d, exceeded the predefined threshold $T_D$. Accordingly, the front end node 200 adjusts the job load metric of at least some of the compute nodes. Specifically, the job load metric of the compute nodes is adjusted by dynamically adjusting the capacity utilizations of each core element in each compute node during runtime, and adjusting the job load metric using the dynamically adjusted capacity utilizations of the core elements in the node, so that the next set of tasks can be sized and distributed in a manner that facilitates near full utilization of the compute nodes. Next, the front end node 200 extracts a fourth plurality of tasks 104a to 104d (not shown) from frame 104, where the number of tasks in the fourth plurality of tasks is selected in correspondence to the number of compute nodes, and where sizes of the tasks in the fourth plurality of tasks are sized based on the adjusted job load metric of each of the compute nodes. Accordingly, the front end node 200 sizes tasks 104a to 104d as 6, 24, 25 and 45, respectively. The front end node 200 distributes the fourth plurality of tasks 104a to 104d to compute nodes 300a to 300d for processing.

Once execution of the fourth plurality of tasks 104a to 104d is complete, the front end node 200 again determines whether a time difference between a response from a compute node that is first to complete its task and a response from a compute node that is last to complete its task exceeds a predefined threshold. In this example, the time difference between a response from compute node 300c, which was the first to complete its task 104c, and a response from compute node 300d, which was the last to complete its task 104d, did not exceed the predefined threshold $T_D$, as shown in the time difference monitor 703 in connection with frame 104. Accordingly, the front end node 200 does not adjust the job load metric, and extracts a fifth plurality of tasks 105a to 105d (not shown) from frame 105, where the number of tasks in the fifth plurality of tasks is selected in correspondence to the number of compute nodes, and where sizes of the tasks in the fifth plurality of tasks are sized remain based on the unadjusted job load metric of each of the compute nodes. Accordingly, the front end node 200 sizes tasks 105a to 105d as 6, 24, and 45, respectively, which are the same sizes that were used to size tasks 104a to 104d. The front end node 200 distributes the fifth plurality of tasks 105a to 105d to compute nodes 300a to 300d for processing, and awaits responses from the compute nodes 300a to 300d to determine if an adjustment to the job load metric is needed.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A computer implemented method for distributing work amongst a plurality of nodes in a distributed computing environment, the method comprising:
   extracting a first plurality of tasks from the work, wherein the number of tasks in the first plurality of tasks is selected in correspondence to the number of nodes, and wherein sizes of the tasks in the first plurality of tasks are sized based on a job load metric of each of the nodes;
   distributing the first plurality of tasks to at least some of the nodes for processing;
   receiving responses of completion of the distributed first plurality of tasks from respective nodes;
   determining whether a time difference between a response from a node that is first to complete its task and a response from a node that is last to complete its task exceeds a predefined threshold;
   responsive to a determination that the time difference exceeds the predefined threshold, adjusting the job load metric of at least some of the nodes;
   extracting a second plurality of tasks from the work, wherein the number of tasks in the second plurality of tasks is selected in correspondence to the number of nodes, and wherein sizes of the tasks in the second plurality of tasks are sized based on the adjusted job load metric of each of the nodes; and
   distributing the second plurality of tasks to at least some of the nodes for processing.

2. The method according to claim 1, wherein adjusting the job load metric comprises dynamically adjusting capacity utilizations for at least some of the core elements in a node during runtime, and adjusting the job load metric using the dynamically adjusted capacity utilizations of the core elements in the node.

3. The method according to claim 2, wherein dynamically adjusting capacity utilizations for at least some of the core elements in a node during runtime comprises reducing the capacity utilizations for a plurality of core elements in the worst performing nodes, and increasing the capacity utilizations for a plurality of core elements in the remaining nodes, wherein adjustments to the capacity utilizations for the plurality of core elements are made in descending order of the influence factor assigned to the core elements.

4. The method according to claim 2, wherein dynamically adjusting capacity utilizations for at least some of the core elements in a node during runtime comprises reducing the capacity utilization for a core element assigned the highest influence factor in the node that is last to complete its task, by a predetermined amount, and increasing the capacity utilization for the core element assigned the highest influence factor in the remaining nodes, wherein the amount increased in each node is proportionate to the existing capacity utilizations for the core element assigned the highest influence factor in the remaining nodes, and wherein the cumulative increase amongst the remaining nodes is equal to the amount that was reduced in the node that is last to complete its task.

5. The method according to claim 1, further comprising:
   transmitting a qualification task for execution by each node, wherein the qualification task measures capabilities of core elements in a node, wherein an influence factor is assigned to each core element, and wherein the influence factor is used to adjust the weight of the core element on a capability measurement of the node;
   receiving the results from the executed qualification task from each node; and
   calculating the job load metric for each node by using the results from the executed qualification task.

6. The method according to claim 5, wherein the influence factors are tailored in correspondence to the nature of the work.

7. The method according to claim 1, further comprising a repetition of the steps of determining whether a time difference between a response from a node that is first to complete its task and a response from a node that is last to complete its task exceeds a predefined threshold; responsive to a determination that the time difference exceeds the predefined threshold, adjusting the job load metric of at least some of the nodes; extracting a second plurality of tasks from the work, wherein the number of tasks in the second plurality of tasks is selected in correspondence to the number of nodes, and wherein sizes of the tasks in the second plurality of tasks are sized based on the adjusted job load metric of each of the nodes; and distributing the second plurality of tasks to at least some of the nodes for processing.

8. The method according to claim 1, wherein the work available for distribution is dynamic in nature such that the amount of work available for distribution is received on an ongoing basis, and wherein the work available for distribution is distributed and processed in the order received.

9. The method according to claim 1, wherein responsive to a determination that the time difference does not exceed the predefined threshold, extracting a second plurality of tasks from the work, wherein the number of tasks in the second plurality of tasks is selected in correspondence to the number of nodes, and wherein sizes of the tasks in the second plurality of tasks remain based on the unadjusted job load metric of each of the nodes; and distributing the second plurality of tasks to some of the nodes for processing.

10. A work distribution apparatus, comprising:
a computer-readable memory constructed to store computer-executable process steps; and
a processor constructed to execute the computer-executable process steps stored in the memory;
wherein the process steps stored in the memory cause the processor to distribute work amongst a plurality of nodes in a distributed computing environment, and wherein the process steps include computer-executable process steps to:
extract a first plurality of tasks from the work, wherein the number of tasks in the first plurality of tasks is selected in correspondence to the number of nodes, and wherein sizes of the tasks in the first plurality of tasks are sized based on a job load metric of each of the nodes;
distribute the first plurality of tasks to at least some of the nodes for processing;
receive responses of completion of the distributed first plurality of tasks from respective nodes;
determine whether a time difference between a response from a node that is first to complete its task and a response from a node that is last to complete its task exceeds a predefined threshold;
responsive to a determination that the time difference exceeds the predefined threshold, adjust the job load metric of at least some of the nodes;
extract a second plurality of tasks from the work, wherein the number of tasks in the second plurality of tasks is selected in correspondence to the number of nodes, and wherein sizes of the tasks in the second plurality of tasks are sized based on the adjusted job load metric of each of the nodes; and
distribute the second plurality of tasks to at least some of the nodes for processing.

11. The apparatus according to claim 10, wherein adjusting the job load metric for a node comprises dynamically adjusting capacity utilizations for at least some of the core elements in a node during runtime, and adjusting the job load metric using the dynamically adjusted capacity utilizations of the core elements in the node.

12. The apparatus according to claim 11, wherein dynamically adjusting capacity utilizations for at least some of the core elements in a node during runtime comprises reducing the capacity utilizations for a plurality of core elements in the worst performing nodes, and increasing the capacity utilizations for a plurality of core elements in the remaining nodes, wherein adjustments to the capacity utilizations for the plurality of core elements are made in descending order of the influence factor assigned to the core elements.

13. The apparatus according to claim 11, wherein dynamically adjusting capacity utilizations for at least some of the core elements in a node during runtime comprises reducing the capacity utilization for a core element assigned the highest influence factor in the node that is last to complete its task, by a predetermined amount, and increasing the capacity utilization for the core element assigned the highest influence factor in the remaining nodes, wherein the amount increased in each node is proportionate to the existing capacity utilizations for the core element assigned the highest influence factor in the remaining nodes, and where the cumulative increase amongst the remaining nodes is equal to the amount that was reduced in the node that is last to complete its task.

14. The apparatus according to claim 10, further comprising:
transmitting a qualification task for execution by each node, wherein the qualification task measures capabilities of core elements in a node, wherein an influence factor is assigned to each core element, and wherein the influence factor is used to adjust the weight of the core element on a capability measurement of the node;
receiving the results from the executed qualification task from each node; and
calculating the job load metric for each node by using the results from the executed qualification task.

15. The apparatus according to claim 14, wherein the influence factors are tailored in correspondence to the nature of the work.

16. The apparatus according to claim 10, further comprising a repetition of the steps of determining whether a time difference between a response from a node that is first to complete its task and a response from a node that is last to complete its task exceeds a predefined threshold; responsive to a determination that the time difference exceeds the predefined threshold, adjusting the job load metric of at least some of the nodes; extracting a second plurality of tasks from the work, wherein the number of tasks in the second plurality of tasks is selected in correspondence to the number of nodes, and wherein sizes of the tasks in the second plurality of tasks are sized based on the adjusted job load metric of each of the nodes; and distributing the second plurality of tasks to at least some of the nodes for processing.

17. The apparatus according to claim 10, wherein the work available for distribution is dynamic in nature such that the amount of work available for distribution is received on an ongoing basis, and wherein the work available for distribution is distributed and processed in the order received.

18. The apparatus according to claim 10, wherein responsive to a determination that the time difference does not exceed the predefined threshold, extracting a second plurality of tasks from the work, wherein the number of tasks in the second plurality of tasks is selected in correspondence to the number of nodes, and wherein sizes of the tasks in the second plurality of tasks remain based on the unadjusted job load metric of each of the nodes; and distributing the second plurality of tasks to some of the nodes for processing.

19. A computer-readable storage medium storing a computer-executable program for causing a computer to perform a method for distributing work amongst a plurality of nodes in a distributed computing environment, the method comprising:
extracting a first plurality of tasks from the work, wherein the number of tasks in the first plurality of tasks is selected in correspondence to the number of nodes, and wherein sizes of the tasks in the first plurality of tasks are sized based on a job load metric of each of the nodes;
distributing the first plurality of tasks to at least some of the nodes for processing;
receiving responses of completion of the distributed first plurality of tasks from respective nodes;

determining whether a time difference between a response from a node that is first to complete its task and a response from a node that is last to complete its task exceeds a predefined threshold;

responsive to a determination that the time difference exceeds the predefined threshold, adjusting the job load metric of at least some of the nodes;

extracting a second plurality of tasks from the work, wherein the number of tasks in the second plurality of tasks is selected in correspondence to the number of nodes, and wherein sizes of the tasks in the second plurality of tasks are sized based on the adjusted job load metric of each of the nodes; and distributing the second plurality of tasks to at least some of the nodes for processing.

20. The computer-readable storage medium according to claim 19, wherein adjusting the job load metric for a node comprises dynamically adjusting capacity utilizations for at least some of the core elements in a node during runtime, and adjusting the job load metric using the dynamically adjusted capacity utilizations of the core elements in the node.

21. The computer-readable storage medium according to claim 20, wherein dynamically adjusting capacity utilizations for at least some of the core elements in a node during runtime comprises reducing the capacity utilizations for a plurality of core elements in the worst performing nodes, and increasing the capacity utilizations for a plurality of core elements in the remaining nodes, wherein adjustments to the capacity utilizations for the plurality of core elements are made in descending order of the influence factor assigned to the core elements.

22. The computer-readable storage medium according to claim 20, wherein dynamically adjusting capacity utilizations for at least some of the core elements in a node during runtime comprises reducing the capacity utilization for a core element assigned the highest influence factor in the node that is last to complete its task, by a predetermined amount, and increasing the capacity utilization for the core element assigned the highest influence factor in the remaining nodes, wherein the amount increased in each node is proportionate to the existing capacity utilizations for the core element assigned the highest influence factor in the remaining nodes, and wherein the cumulative increase amongst the remaining nodes is equal to the amount that was reduced in the node that is last to complete its task.

23. The computer-readable storage medium according to claim 19, further comprising:

transmitting a qualification task for execution by each node, wherein the qualification task measures capabilities of core elements in a node, wherein an influence factor is assigned to each core element, and wherein the influence factor is used to adjust the weight of the core element on a capability measurement of the node;

receiving the results from the executed qualification task from each node; and calculating the job load metric for each node by using the results from the executed qualification task.

24. The computer-readable storage medium according to claim 23, wherein the influence factors are tailored in correspondence to the nature of the work.

25. The computer-readable storage medium according to claim 19, further comprising a repetition of the steps of determining whether a time difference between a response from a node that is first to complete its task and a response from a node that is last to complete its task exceeds a predefined threshold; responsive to a determination that the time difference exceeds the predefined threshold, adjusting the job load metric of at least some of the nodes; extracting a second plurality of tasks from the work, wherein the number of tasks in the second plurality of tasks is selected in correspondence to the number of nodes, and wherein sizes of the tasks in the second plurality of tasks are sized based on the adjusted job load metric of each of the nodes; and distributing the second plurality of tasks to at least some of the nodes for processing.

26. The computer-readable storage medium according to claim 19, wherein the work available for distribution is dynamic in nature such that the amount of work available for distribution is received on an ongoing basis, and wherein the work available for distribution is distributed and processed in the order received.

27. The computer-readable storage medium according to claim 19, wherein responsive to a determination that the time difference does not exceed the predefined threshold, extracting a second plurality of tasks from the work, wherein the number of tasks in the second plurality of tasks is selected in correspondence to the number of nodes, and wherein sizes of the tasks in the second plurality of tasks remain based on the unadjusted job load metric of each of the nodes; and distributing the second plurality of tasks to some of the nodes for processing.

28. A computer implemented work distribution module for distributing work amongst a plurality of nodes in a distributed computing environment, the work distribution module comprising:

an extraction module constructed to extract a first plurality of tasks from the work, wherein the number of tasks in the first plurality of tasks is selected in correspondence to the number of nodes, and wherein sizes of the tasks in the first plurality of tasks are sized based on a job load metric of each of the nodes;

a distribution module constructed to distribute the first plurality of tasks to at least some of the nodes for processing;

a receiving module constructed to receive responses of completion of the distributed first plurality of tasks from respective nodes;

a determination module constructed to determine whether a time difference between a response from a node that is first to complete its task and a response from a node that is last to complete its task exceeds a predefined threshold;

a job load metric adjuster module constructed to adjust the job load metric of at least some of the nodes in response to a determination that the time difference exceeds the predefined threshold;

wherein the extraction module is further constructed to extract a second plurality of tasks from the work, wherein the number of tasks in the second plurality of tasks is selected in correspondence to the number of nodes, and wherein sizes of the tasks in the second plurality of tasks are sized based on the adjusted job load metric of each of the nodes; and wherein the distribution module is further constructed to distribute the second plurality of tasks to at least some of the nodes for processing.

29. The work distribution module according to claim 28, wherein the job load adjuster module is further constructed to dynamically adjust capacity utilizations for at least some of the core elements in a node during runtime, and to adjust the job load metric for each node using the dynamically adjusted capacity utilizations for that node.

30. The work distribution module according to claim 29, wherein the job load adjuster module is further constructed to dynamically adjust capacity utilizations for at least some of the core elements in a node during runtime comprises reducing the capacity utilizations for a plurality of core elements in the worst performing nodes, and to increase the capacity utilizations for a plurality of core elements in the remaining nodes, wherein adjustments to the capacity utilizations for the plurality of core elements are made in descending order of the influence factor assigned to the core elements.

31. The work distribution module according to claim 29, wherein the job load adjuster module is further constructed to dynamically adjust capacity utilizations for at least some of the core elements in a node during runtime comprises by reducing the capacity utilization for a core element assigned the highest influence factor in the node that is last to complete its task, by a predetermined amount, and to increase the capacity utilization for the core element assigned the highest influence factor in the remaining nodes, wherein the amount increased in each node is proportionate to the existing capacity utilizations for the core element assigned the highest influence factor in the remaining nodes, and wherein the cumulative increase amongst the remaining nodes is equal to the amount that was reduced in the node that is last to complete its task.

32. The work distribution module according to claim 28, wherein the distribution module is further constructed to transmit a qualification task for execution by each node, wherein the qualification task measures capabilities of core elements in a node, wherein an influence factor is assigned to each core element, and wherein the influence factor is used to adjust the weight of the core element on a capability measurement of the node; wherein the receiving module is further constructed to receive the results from the executed qualification task from each node; and wherein the job load metric adjuster module is further constructed to calculate the job load metric for each node by using the results from the executed qualification task.

33. The work distribution module according to claim 32, wherein the distribution module is further constructed to tailor the influence factors in correspondence to the nature of the work.

34. The work distribution module according to claim 28, wherein the determination, just load metric adjuster, extraction, and distribution modules are further constructed to repeat the steps of determining whether a time difference between a response from a node that is first to complete its task and a response from a node that is last to complete its task exceeds a predefined threshold; responsive to a determination that the time difference exceeds the predefined threshold, adjusting the job load metric of at least some of the nodes; extracting a second plurality of tasks from the work, wherein the number of tasks in the second plurality of tasks is selected in correspondence to the number of nodes, and wherein sizes of the tasks in the second plurality of tasks are sized based on the adjusted job load metric of each of the nodes; and distributing the second plurality of tasks to at least some of the nodes for processing.

35. The work distribution module according to claim 28, wherein the work available for distribution is dynamic in nature such that the amount of work available for distribution is received on an ongoing basis, and wherein the extraction module is further constructed to distribute and process the work in the order received.

36. The work distribution module according to claim 28, wherein responsive to a determination that the time difference does not exceed the predefined threshold, the extraction module is further constructed to extract a second plurality of tasks from the work, wherein the number of tasks in the second plurality of tasks is selected in correspondence to the number of nodes, and wherein sizes of the tasks in the second plurality of tasks remain based on the unadjusted job load metric of each of the nodes; and the distribution module is further constructed to distribute the second plurality of tasks to some of the nodes for processing.

* * * * *